United States Patent
Lee et al.

(10) Patent No.: US 6,902,745 B2
(45) Date of Patent: Jun. 7, 2005

(54) METHOD OF MANUFACTURING NANO-SIZED LITHIUM-COBALT OXIDES BY FLAME SPRAYING PYROLYSIS

(75) Inventors: Churl Kyoung Lee, Daejeon (KR); Hee Dong Jang, Daejeon (KR); Do Su Kim, Daejeon (KR); Jung Soo Shon, Daejeon (KR)

(73) Assignee: Korea Institute of Geosciences and Mineral Resources, Daejeon (KR)

( * ) Notice: Subject to any disclaimer, the term of this patent is extended or adjusted under 35 U.S.C. 154(b) by 0 days.

(21) Appl. No.: 10/282,022

(22) Filed: Oct. 29, 2002

(65) Prior Publication Data

US 2003/0221589 A1 Dec. 4, 2003

(30) Foreign Application Priority Data

Jun. 3, 2002 (KR) .............................. 10-2002-0031167

(51) Int. Cl.[7] .................. A01N 25/00; A01N 59/16; C01G 51/04; C01D 15/02; H01M 4/52
(52) U.S. Cl. .................. 424/489; 424/646; 423/141; 423/149; 423/179.5; 423/594.6; 429/231.95
(58) Field of Search ............................... 424/489, 646; 423/141, 149, 179.5, 594.6; 429/231.95

(56) References Cited

U.S. PATENT DOCUMENTS

| | | | | |
|---|---|---|---|---|
| 4,567,031 A | * | 1/1986 | Riley | 423/594.2 |
| 4,842,832 A | * | 6/1989 | Inoue et al. | 423/21.1 |
| 6,383,235 B1 | * | 5/2002 | Maegawa et al. | 29/623.5 |
| 6,620,400 B2 | * | 9/2003 | Gao et al. | 423/594.15 |
| 2003/0235528 A1 | * | 12/2003 | Wu et al. | 423/599 |

OTHER PUBLICATIONS

Horne, Craig, "Nano–crystalline lithium transition–metal oxides for lithium rechargeable batteries," Proceedings—Electrochemical Society, vol. 2000–21, pp. 1–7 (Oct. 2000).*

Zhecheva, E. et al., "Ultrafine layered LiCoO2 obtained from citrate precursors," Ionics, vol. 3 (1 & 2), pp. 1–15 (1997).*

* cited by examiner

*Primary Examiner*—John Pak
(74) *Attorney, Agent, or Firm*—GWiPS

(57) ABSTRACT

A method for producing nano-sized lithium-cobalt oxide is provided by using flame-spray pyrolysis. The method comprises the steps of: spraying minute droplets, which is a solution dissolved lithium salt with cobalt salt at room temperature; atomizing the minute droplets through rapid expansion into a high temperature environment generated by combusting oxygen and hydrogen; decomposing and oxidizing the atomized minute droplets thermally at high temperature to produce nano-sized oxides in gaseous phase: and collecting the produced nano-sized composite oxides particles. The produced nano-sized lithium-cobalt oxide can be applied to a highly efficient lithium battery as the electrode materials and a thin film type of battery as well as to a miniaturized battery.

5 Claims, 4 Drawing Sheets

METHOD OF MANUFACTURING NANO-SIZED LITHIUM-COBALT OXIDES BY FLAME SPRAYING PYROLYSIS

BACKGROUND OF THE INVENTION

1. Field of the Invention

The present invention relates to a method of producing nano-sized lithium-cobalt oxide utilizing a flame spray pyrolysis. More particularly, this method is related to effectively producing nano-sized lithium-cobalt oxide as an electrode material for storing energy from an aqueous metal solution containing lithium and cobalt metallic salt by utilizing flame spray pyrolysis. Especially, the nano-sized lithium-cobalt oxide is verified to have the necessary super-electrochemical properties to act as the active material for a lithium ion battery.

2. Description of the Prior Art

Because lithium batteries are capable of providing high energy densities while maintaining a low weight, the lithium battery has become a major power source for most small portable electrical equipment beginning in the mid 1980s.

Recently, use of the lithium ion secondary battery, which is a type of lithium battery, has rapidly increased. The lithium ion secondary battery comprises a cathode, anode, organic electrolyte and organic separator. Lithium-cobalt oxide, when used as the active material, has the properties of excellent reversibility, low discharge rate, high capacity, high energy density and easy synthesis. Lithium-cobalt oxide is presently commercialized.

Even though the lithium ion secondary battery has a relatively longer life span of between charges, it is limited to 500 cycles of charging/discharging. Therefore, experiments are being conducted to develop new materials for a long life battery having a high operating voltage and a large capacity for charging/discharging with high efficiency.

In particular, nano-sized lithium-cobalt oxide developed for use in the lithium battery enables not only increasing the existing benefits of excellent specific energy and speed of charging/discharging, but also providing stabilization over many cycles when the lithium ion is performing the intercalation-deintercalation. Thus, it is anticipated that a battery made with nano-size electrode materials will provide have high efficiency with longer life spans than the presently commercialized battery made with 10 $\mu$m~30 $\mu$m of lithium-cobalt oxide.

The methods suggested for producing nano-sized lithium-cobalt oxide employs the processes of zol-gel, dehydrofreezing evaporation, supercritical dehydration, supersonic hydrothermal synthesis and ultra sonic processing.

Furthermore, the process of solid states synthesis for producing the lithium-cobalt oxide is well known and is a simple and economical process. However, this process has difficulty producing micro-sized particles below 10 $\mu$m of the lithium-cobalt oxide due to coagulation arising from the non-uniform distribution of the particles, the non-cathode synthesis and solid phase reaction.

SUMMARY OF THE INVENTION

An object of the present invention is to provide a method of producing a nano-sized lithium-cobalt oxide utilizing a flame spray pyrolysis. This process will provide excellent charging/discharging performance and high cycle stability properties, significantly prolonging the life span of a battery. The nano-sized lithium-cobalt oxide produced by utilizing a vaporization process possesses super-electrochemical properties so that it can combine high efficiency with the long life span of a lithium battery.

Another object of the present invention is to provide a process for producing a lithium-cobalt oxide, which has a particle size of less than a few tens of nano-meters from a solution containing lithium and cobalt salts through flame spray pyrolysis.

BRIEF DESCRIPTION OF THE DRAWINGS

FIG. 1 is a schematic drawing illustrating an apparatus configuration to produce the nano-sized particles according to the present invention.

FIG. 2 is a TEM photograph of lithium-cobalt oxide produced by the present invention.

DETAILED DESCRIPTION OF THE PREFERRED EMBODIMENTS

Figure 3:
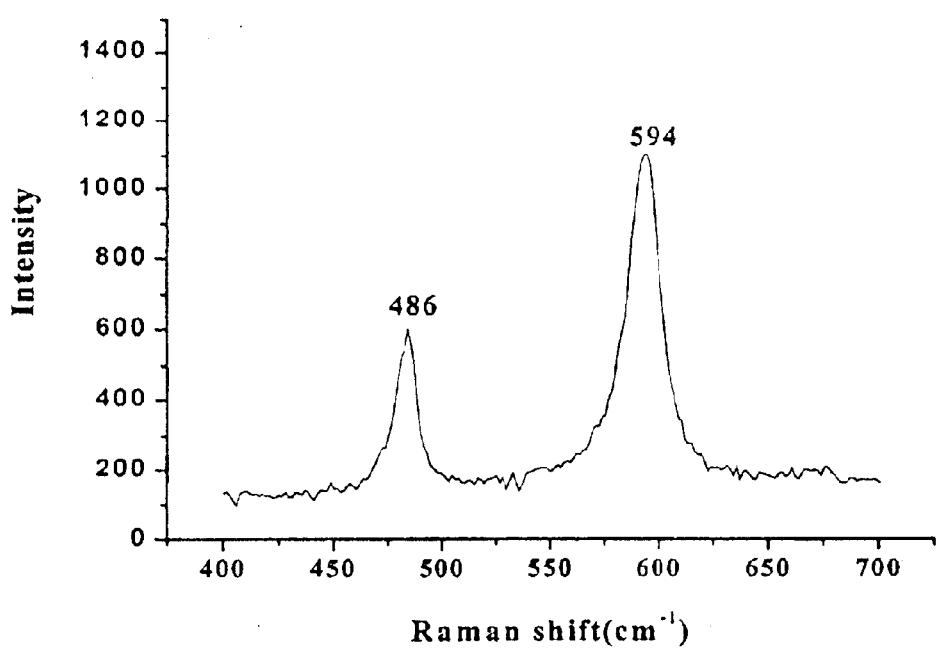
FIG. 3 is a graph illustrating a result of Raman analysis of lithium-cobalt oxide produced by the present invention.
Figure 4:
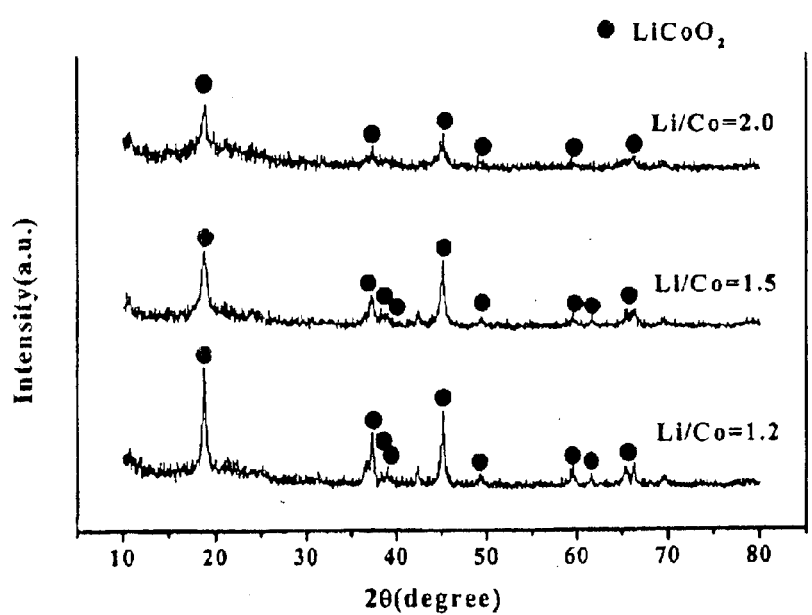
FIG. 4 is a graph illustrating a result of X-ray diffraction analysis of lithium-cobalt oxide powder produced depending on the variation of the lithium and cobalt mole ratio.

To achieve the above-mentioned objectives, a method of the present invention provides for producing the nano-sized lithium-cobalt oxide by utilizing a flame spray pyrolysis. The production method comprises the steps of: spraying minute droplets under low temperature from a solution dissolved with a certain ratio of lithium salt and cobalt salt; atomizing the minute droplets by spraying them into a high temperature environment generated by combusting oxygen and hydrogen so that the minute droplets are rapidly expanded; decomposing the atomized liquid droplets rapidly and thermally in a high temperature environment; condensing the nano-sized composite oxides produced in gaseous phase; and collecting the nano-sized composite oxide produced in a gaseous phase.

Hereinafter, the preferred embodiments of the present invention will be described in detail with reference to the accompanying drawings.

Figures 1, 2:
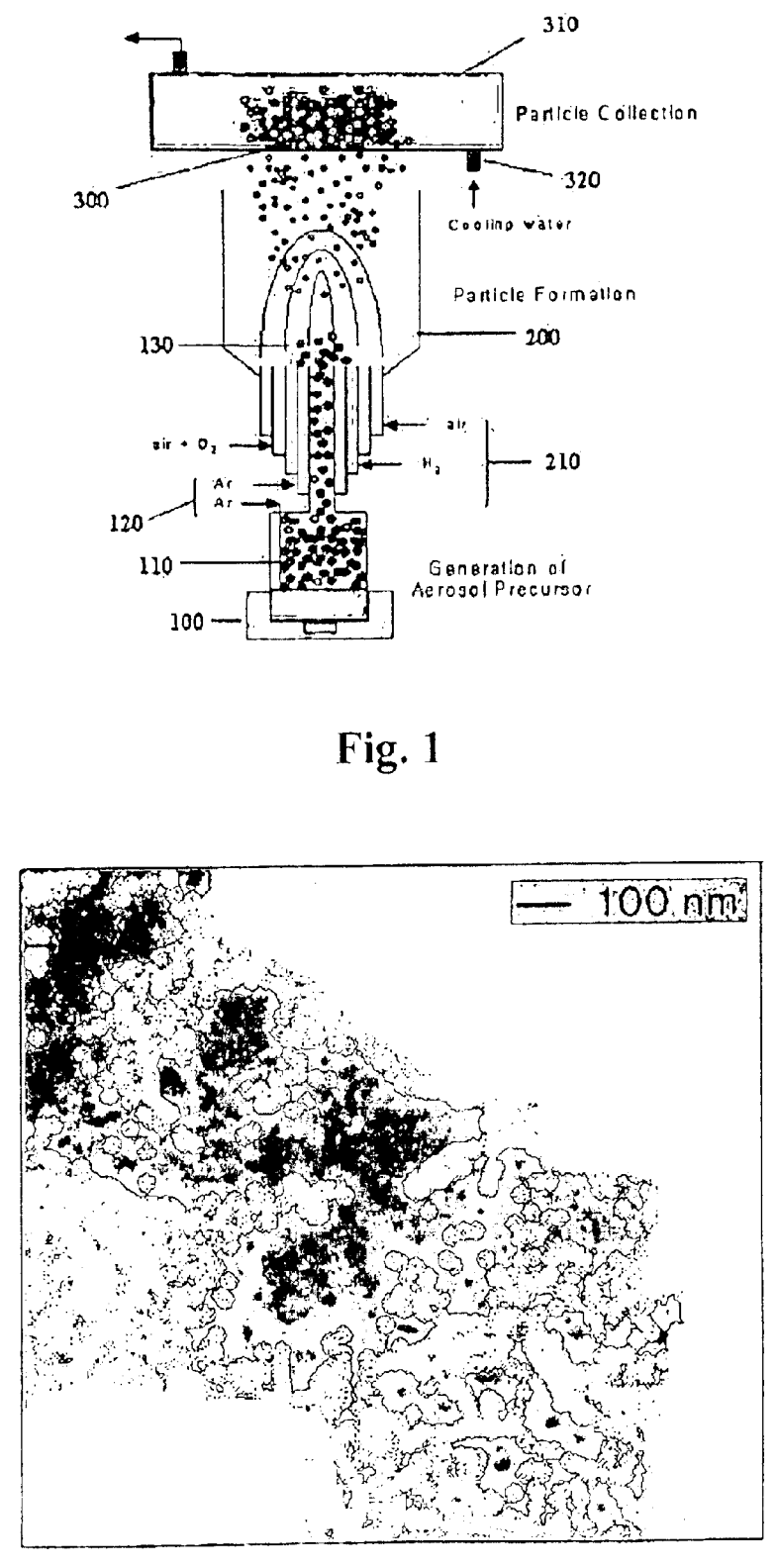

As shown in FIG. 1, an apparatus of the present invention comprises a minute droplet generating section 100, a combusting section 200 and a particle collecting section 300.

In the minute droplet generating section 100, a solution S, which is a mixture of lithium salt with cobalt salt is filled in the reservoir. An ultrasonic generator is installed in the solution reservoir 110 for producing the minute droplets. A gas injection tube 120 for supplying gas and a solution discharging tube 130 are connected to the solution reservoir 10.

The solution discharging tube 130 is connected to the interior of the burner 200. At one side of the burner 200, five gas injection tubes 210 as a heat source are connected to the combustor or combustion chamber 200.

In the particle collector 300, a condensation tube 310 having a coolant inlet tube 320 condenses the vaporized particles, which are expanded by the combustor 200.

The operation of the apparatus for producing the nano-sized particles is described as follows:

As shown in FIG. 1, 50 ml of aqueous solutions containing metal salts is filled in the solution reservoir 110 for generating the minute droplets by an ultrasonic vibrator.

Sequentially, Argon (Ar) gas is supplied to the solution reservoir 110 through the gas injection tube 120 in order to readily transmit the generated droplets into the interior of the combustor 200 through the five gas injection tubes 210.

At this moment, the interior temperature of the combustion chamber must be maintained above 800° C. to maintain the flame of a vapor phase oxidizing reaction. Therefore, a technology is required to have the vapor phase reaction at a high temperature along with a continuous gas supply.

For technical reasons, the present invention adopts a sequential order of supplying gas through the five gas injection tubes 210 of the heat source to the burner 200. To generate the flame, gases are supplied in the following order, starting from the center tube and moving outward: reacting substance plus argon, argon, hydrogen, oxygen, plus air and air. The temperature of the flame and retaining time for reacting the substances are controlled by adjusting the amount of hydrogen, oxygen and air supplied to the burner.

The lithium-cobalt oxide generated by a heat decomposing reaction occurring within the flame is collected at the particle collector 300 disposed above the burner by condensing through the coolant inlet tube 320.

In the present invention, the minute droplets are formed from a solution of lithium salt and cobalt salt under the room temperature.

Sequentially, the minute droplets are injected into an environment of high temperature range of 800° C.~1700° C. generated by the combustion of oxygen and hydrogen. At this moment, the minute droplets are rapidly expanded to begin atomizing.

Continuously, the atomized droplets are thermally decomposed and oxidized at a high temperature range of 800° C.~1700° C. in a few seconds to produce nano-sized oxide particles.

The nano-sized particles generated by thermal decomposition and oxidation is then condensed and collected.

In the following implementing examples, the method of producing the nano-sized particles through the above-mentioned steps will be described in detail.

A metallic aqueous solution containing lithium salt and cobalt metallic salt is prepared as a reacting solution to produce the nano-sized lithium-cobalt oxide by a heat decomposing oxidation reaction utilizing the flame.

Initially, the materials of lithium acetate ($LiCH_3COO$) as the lithium salt and cobalt acetate ($Co(CH_3COO)_2$) as the cobalt metallic salt were selected. From these crude salts, a metallic aqueous solution containing lithium salt and cobalt metal salt is produced by adjusting the mole ratio of lithium and cobalt.

At this point, the lithium salt is selected either one group of lithium acetate ($LiCH_3COO$), lithium nitrate ($LiNO_3$), lithium hydroxide (LiOH) or lithium carbonate ($Li_2CO_3$). The cobalt salt is selected either one group of cobalt acetate ($Co(CH_3COO)_2$), cobalt nitrate ($Co(NO_3)_2$), cobalt hydroxide ($Co(OH)_2$) or cobalt carbonate ($CoCO_3$).

As shown in FIG. 1, 50 ml of the reacting solution produced through the above process is filled into the solution reservoir 110 to generate the minute droplets at low temperature by an ultrasonic vibrator.

Sequentially, a certain amount of Argon (Ar) gas is supplied to one side of the solution reservoir 110 through the gas injection tube 120 to readily transmit the generated droplets to the interior of the combustor 200.

At this point, the interior temperature of the combustor must be maintained above 800° C. to maintain the flame for vapor phase oxidizing reaction. Therefore, a technology is required to have the vapor phase reaction at a high temperature along with a continuous gas supply.

For technical reasons, a sequential order is adopted for supplying gases through the five gas injection tubes 210 of the heat source to the burner 200. To generate the flame, gases are supplied in the sequential order, starting from the center tube to outward: reacting substance plus argon, argon, hydrogen, oxygen, plus air and air. The flame temperature and retaining time for reacting the substances are controlled by adjusting the amount of hydrogen, oxygen and air being supplied to the burner.

The lithium-cobalt oxide, which is generated by thermal decomposing and oxidation of the atomized droplets of reactants in the flame is collected at the lower part of condensation tube 310 by condensing through the coolant inlet tube 320.

Lithium acetate and cobalt acetate are selected among the various lithium salts and cobalt metallic salts to produce the nano-sized lithium-cobalt oxide. The reacting formula proposed by the present invention is represented as follows:

(Reacting Formula 1)

$LiCH_3COO(aq) + Co(CH_3COO)_2(aq) + 3O_2(g) \rightarrow LiCoO_2(s) + 5CO_2(g)\uparrow + 9/2 H_2(g)\uparrow$

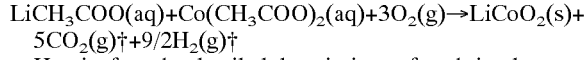

Hereinafter, the detailed descriptions of each implementing example of the present invention are presented for the variations of the properties of the lithium-cobalt oxide particles depending on varying the mole ratios of lithium and cobalt and hydrogen flow rate.

In the present invention, the supplied gases to the burner are arranged so that the first and second injection tube are for Argon gas, the third injection tube is for hydrogen gas, the fourth injection tube is for oxygen gas and the fifth injection tube is for air. A series of experiments for producing the nano-sized lithium-cobalt oxide is carried out by varying the flow rates of the supplied gases and reacting mole ratios of lithium salt and cobalt salt and lithium and cobalt.

Implementing Example 1

Lithium acetate and cobalt acetate are selected as the initial raw materials. An aqueous solution is prepared with 1.2 mole ratios of lithium and cobalt. Then, 50 ml of the prepared aqueous solution is poured into the solution reservoir 110 to generate the minute droplets by the ultrasonic vibrator at the low temperature. The generated droplets are continuously transmitted to the burner by Argon gas with a flow rate of 2 l/min.

The temperature of the interior burner must be maintained in the range of 800° C.~1700° C. to provide a vapor phase oxidizing reaction. At this point, the flame is controlled by adjusting the concentration of hydrogen to 1:1 and the air flow rate to 20 vol %~50 vol %. In order to achieve the above conditions, gases are supplied to the burner through the five injection tubes: reacting substance plus argon, argon, hydrogen, oxygen, plus air and air from the center tube to outward. As a result, the generated particle size of lithium-cobalt oxide is in the range of a couple of tens of nano meters as shown in FIG. 2.

Further, crystallinity of the collected lithium-cobalt oxide is verified by a powder X-ray diffraction analyzer. The results shown in FIG. 3 reveals that the crystallinity is the same as the commercialized 99.8% pure lithium-cobalt oxide.

Implementing Example 2

Using the same method as Implementing Example 1, the mole ratios of lithium and cobalt are gradually increased from 1.2 through 2.0 for producing the lithium-cobalt oxide. The crystallinity is examined for the collected lithium-cobalt oxide by a powder X-ray diffraction analyzer.

The results as shown in FIG. 3, the crystallinity of lithium-cobalt oxide deteriorates as the mole ratios of lithium and cobalt are increased in the initial solution. At the peak, the phase purity ($I_{003}/I_{104}$, integrated ratio) is transformed to a deteriorated state.

Accordingly, when an aqueous solution adjusted within 1.2 mole ratios of lithium and cobalt is selected, an excellent uni-phase crystallinity of the lithium-cobalt oxidized powder could be produced.

Implementing Example 3

Under the same conditions as the Implementing Example 1, the effect of the reacting temperature on the crystallization of the lithium-cobalt oxide is ascertained while the flow rate of hydrogen is varied between 15%~35% with the fixed volume rates of oxygen 30%, argon 10% and air 25% in the total gas flow rates.

Since the flame is generated by the combustion of hydrogen, the flame temperature increases with an increase in the hydrogen gas flow rate. According to the present invention, the flame temperature is able to increase in the range of 800° C. to 1700° C. as the hydrogen gas flow rate varies from 15% to 35% while the argon gas flow rate varies from 5% to 15% by volume.

Figure 5:
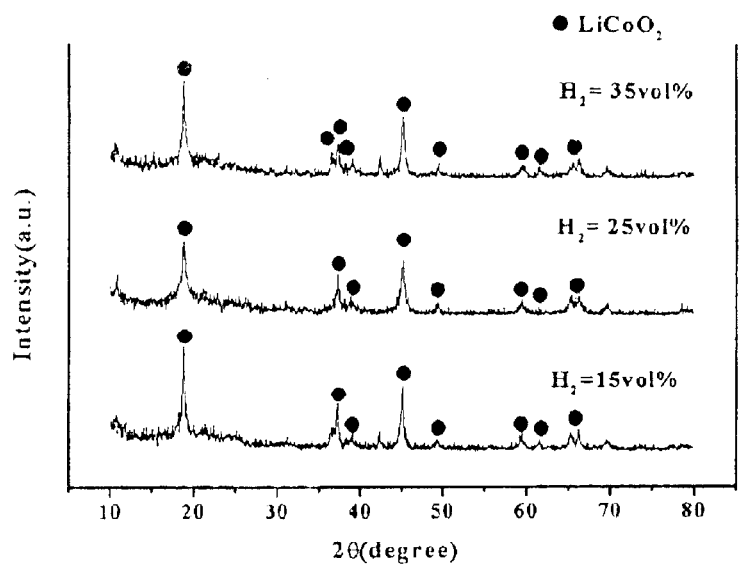
FIG. 5 is a graph illustrating a result of X-ray diffraction analysis of lithium-cobalt oxide powder produced depending on the variation of the hydrogen flow rate.

As shown in FIG. 5, the lithium-cobalt oxide powder produced by varying the hydrogen gas flow rates i.e., varying the flame temperature is analyzed with an X-ray diffraction analyzer. The result shows that there is no remarkable effect from varying the hydrogen gas flow rates or flame temperatures compared with varying the mole ratios of lithium and cobalt. However, it is noticeable that the crystallinity of the lithium-cobalt oxide powder is improved at the peak when increasing the hydrogen gas flow rates (the reacting temperature).

However, it is preferable to maintain the hydrogen gas flow rate below 30% to produce a pure lithium-cobalt oxide which is exclusive of the products of intermediate transformations such as cobalt oxide (CoO) found at 2θ=35.25°, and 42.40°, beside the peak.

Implementing Example 4

Figure 6:
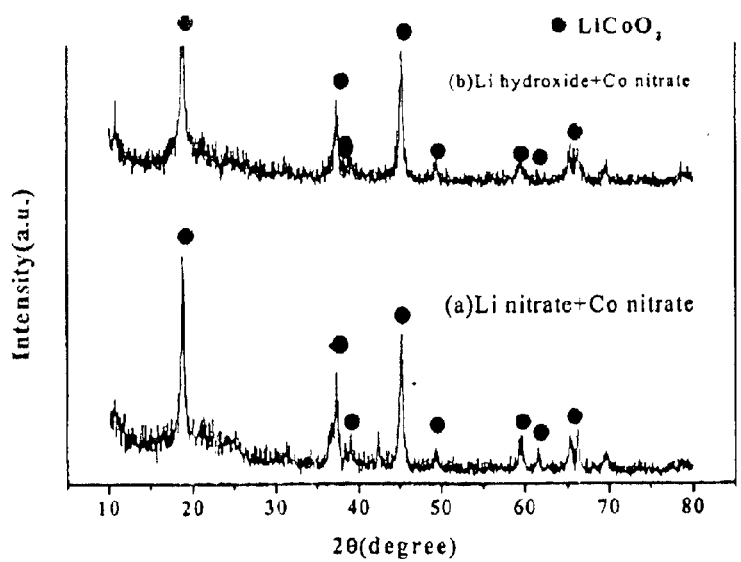
FIG. 6 is a graph illustrating a result of X-ray diffraction analysis of lithium-cobalt oxide powder produced by using lithium and cobalt salts.

Under the same conditions and method of the Implementing Example 1, lithium nitrate and cobalt nitrate are selected as raw materials for producing the lithium-cobalt oxide. As shown (a) in FIG. 6, the analysis of the lithium-cobalt oxidized powder produced by the selected nitrate salts reveals the same uni-phase crystallinity of the lithium-cobalt oxide as produced by the selected acetate salts in the Implementing Example 1.

(Reacting Formula 2)

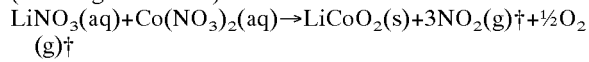

Implementing Example 5

Under the same conditions and method of the Implementing Example 1, lithium hydroxide and cobalt nitrate are selected as raw materials for producing the lithium-cobalt oxide. As shown (b) in FIG. 6, the analysis of the lithium-cobalt oxidized powder produced by the lithium hydroxide and cobalt nitrate reveals the same uni-phase crystallinity of the lithium-cobalt oxide by utilizing the flame spray pyrolysis.

(Reacting Formula 3)

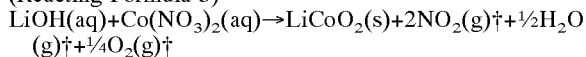

Implementing Example 6

Figure 7A:
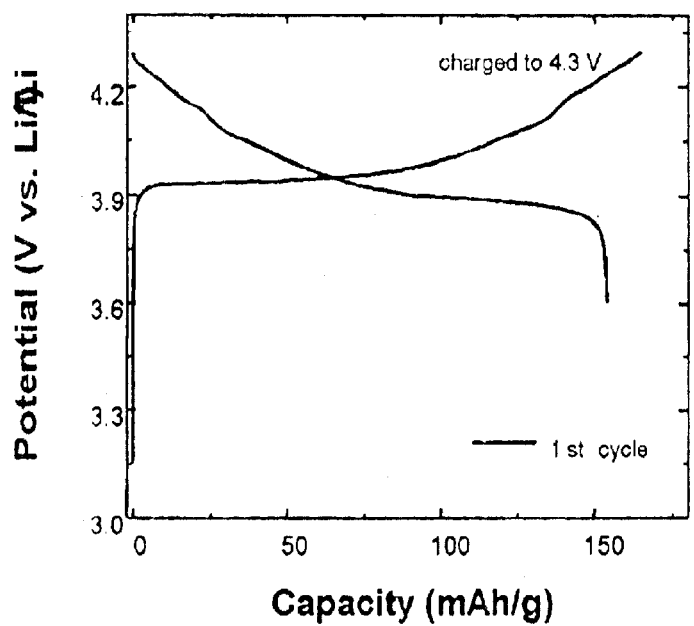
FIGS. 7($a$) and 7($b$) are graphs illustrating the properties of charging/discharging and cycle spans when the lithium-cobalt oxide is employed in to the lithium battery as a cathode active material according to the present invention.

When the lithium-cobalt oxide produced in the Implementing Example 1 is applied to the anode of a lithium battery, the charging/discharging curves are shown in FIG. 7(a). The capacities of the charging or discharging in the first cycle are 165 mAh/g and 154 mAh/g, respectively. This battery capacity is revealed that it has much higher values than conventional battery capacities of the charging/discharging used for the anodes in the battery industry.

Figure 7B:
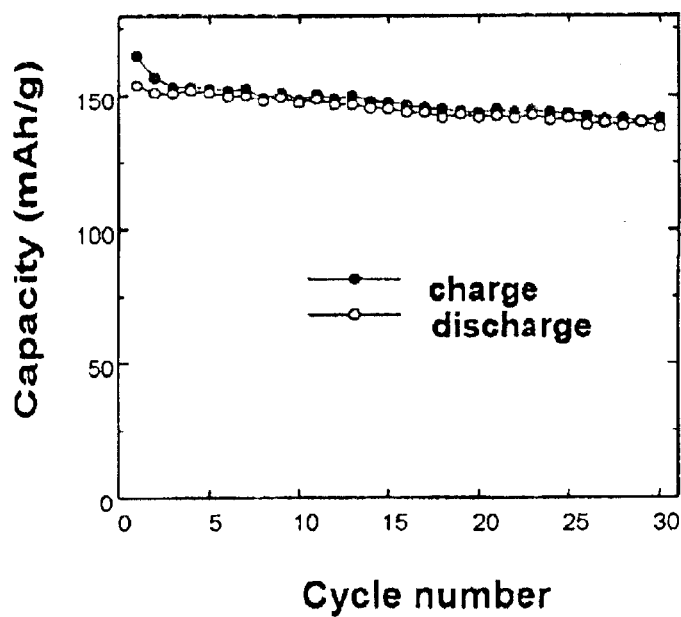

FIG. 7(b) represents the behavior of an anode cycle showing a tendency to decrease the charging/discharging capacities as the number of charging/discharging cycles is increased. It shows that after 30 cycles the capacity is decreased by 10% compared to the first cycle.

As a result, the lithium-cobalt oxide produced by utilizing the flame spraying pyrolysis is possibly applied to energy storage materials such as a lithium battery.

According to the above-mentioned apparatus and method, it is possible to produce the super nano-sized particle as valuable powdered active bipolar materials. Especially, it enables the production of energy storage materials possessing excellent electrochemical properties such as a lithium battery.

It is also possible to control the thermal decomposition conditions for producing the nano-sized lithium-cobalt oxide powder by flame spray pyrolysis. Therefore, the oxidization/reduction condition of the cobalt is precisely adjusted to produce very pure lithium-cobalt oxide with excellent crystallinity. Thus, it enables an application as an energy storage material in the electrode of a lithium battery.

According to the present invention, it is able to produce a nano-sized lithium-cobalt oxide having excellent highly purity and crystallinity without any postproduction treatment. It also allows an easy adjustment to the reacting condition to produce the powder without problems that would require post processing, such as calcinations. When it is applied to the lithium battery as bipolar materials, it could prolong the life span and increase the charging/discharging speed.

It is also possible to apply the highly efficient lithium battery to the bipolar active materials. Due to the high energy density of lithium batteries, the electrode materials enable the application of the thin film type of battery as well as miniaturized type of battery.

The preferred embodiments of the present invention are described with reference to the drawings. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. A method of producing nano-sized lithium-cobalt oxide by utilizing a flame spray pyrolysis, the method comprises the step of:

spraying minute droplets, which is a solution of dissolved lithium salt and cobalt salt at a temperature below 100° C., atomizing the minute droplets by rapidly expanding into an environment of high temperature in the range of 800° C. to 1700° C. provided by combusting oxygen and hydrogen, decomposing the atomized droplets thermally at said environment of high temperature in a few seconds to produce nano-sized oxides in gaseous phase, and condensing and collecting the produced nano-sized lithium-cobalt oxides.

2. The method as claimed in claim 1, wherein said solution of dissolved lithium salt and cobalt salt has 1.2–2.0 mole ratio of lithium salt to cobalt salt.

3. The method as claimed in claim 2, wherein said lithium salt is selected from the group consisting of lithium acetate ($LiCH_3COO$), lithium nitrate ($LiNO_3$), lithium hydroxide (LiOH) and lithium carbonate ($Li_2CO_3$), and said cobalt salt is selected from the group consisting of cobalt acetate ($Co(CH_3COO)_2$), cobalt nitrate ($Co(NO_3)_2$), cobalt hydroxide ($Co(OH)_2$) and cobalt carbonate ($CoCO_3$).

4. The method as claimed in claim 1, wherein said minute droplets are produced by utilizing an ultrasonic generator disposed in a fluid reservoir.

5. The method as claimed in claim 1, wherein said high temperature is generated by a heat source which has five gas injection tubes, wherein the five gas injection tubes are arranged in sequential order starting from the center tube and moving outward, so that the center tube supplies said minute droplets and argon, and the remaining tubes in subsequent sequential order supply argon, hydrogen, oxygen plus air, and air.

* * * * *